US012255887B2

(12) United States Patent
Katyal et al.

(10) Patent No.: US 12,255,887 B2
(45) Date of Patent: Mar. 18, 2025

(54) EARLY TERMINATION OF SECURE HANDSHAKES

(71) Applicant: Sophos Limited, Abingdon (GB)

(72) Inventors: Amit Katyal, Bangalore (IN); Venkata Suresh Reddy Obulareddy, Bangalore (IN)

(73) Assignee: Sophos Limited, Abingdon (GB)

( * ) Notice: Subject to any disclaimer, the term of this patent is extended or adjusted under 35 U.S.C. 154(b) by 350 days.

(21) Appl. No.: 17/704,384

(22) Filed: Mar. 25, 2022

(65) Prior Publication Data

US 2023/0308433 A1    Sep. 28, 2023

(51) Int. Cl.
*H04L 9/40* (2022.01)
(52) U.S. Cl.
CPC ...... *H04L 63/0838* (2013.01); *H04L 63/0435* (2013.01); *H04L 63/1416* (2013.01); *H04L 63/16* (2013.01); *H04L 63/20* (2013.01)
(58) Field of Classification Search
CPC ............. H04L 63/0838; H04L 63/0435; H04L 63/1416; H04L 63/166; H04L 63/20; H04L 63/1458; H04L 63/0869; H04L 63/062; H04L 63/0823
See application file for complete search history.

(56) References Cited

U.S. PATENT DOCUMENTS

| 2008/0065880 | A1* | 3/2008 | Martin | ............... | H04L 63/1441 |
| | | | | | 713/181 |
| 2014/0157385 | A1* | 6/2014 | Kuegler | ............... | H04L 9/0844 |
| | | | | | 726/7 |
| 2016/0044023 | A1 | 2/2016 | Barr et al. | | |
| 2017/0310693 | A1 | 10/2017 | Howard et al. | | |
| 2019/0013945 | A1* | 1/2019 | Hamlin | ............... | G06F 11/0709 |
| 2023/0052917 | A1* | 2/2023 | Liu | ........................ | H04W 12/50 |

FOREIGN PATENT DOCUMENTS

WO    WO-2023180685    9/2023

OTHER PUBLICATIONS

Linn, J. et al., "OTP Methods for TLS", Jun. 5, 2006, 21 pages.
Paterson, Kenneth G. et al., "One-Time-Password-Authenticated Key Exchange", 18 pages.
EPO, "PCT Application No. PCT/GB2023/050557 International Search Report and Written Opinion mailed May 26, 2023",, 16 pages.

* cited by examiner

*Primary Examiner* — Mohammad W Reza
(74) *Attorney, Agent, or Firm* — Strategic Patents, P.C.

(57) ABSTRACT

A Transport Layer Security (TLS) handshake can be terminated early—i.e., before certificate validation—to reduce server-side demand, which can be particularly advantageous in counteracting Denial-of-Service (DOS) attacks and the like. To this end, an endpoint may provide a one-time password (OTP) in the client hello message during the initial steps of a TLS handshake or similar connection protocol. A gateway, upon receiving the client hello message, may generate its own OTP for comparison with the OTP in the client hello message. The endpoint and gateway may advantageously generate the OTP based on a secret provided by a threat management facility with a preexisting secure connection to the two entities. If the OTP provided in the client hello message and the OTP generated on the gateway are the same, then the TLS handshake may continue; otherwise, the Transmission Control Protocol (TCP) connection will be terminated by the gateway.

21 Claims, 5 Drawing Sheets

EARLY TERMINATION OF SECURE HANDSHAKES

BACKGROUND

Transport Layer Security (TLS) handshakes support secure two-way communications between compute instances coupled to a network. While TLS is secure, it is also relatively computationally complex, which can pose significant burdens when a denial-of-service attack or similar exploit is initiated by devices that request a secure handshake even if they are ultimately un-authenticatable. There remains a need for an improved cryptographic handshake that permits early detection of unauthorized devices by a gateway or other network device.

SUMMARY

A Transport Layer Security (TLS) handshake can be terminated early—i.e., before certificate validation—to reduce server-side demand, which can be particularly advantageous in counteracting Denial-of-Service (DOS) attacks and the like. To this end, an endpoint may provide a one-time password (OTP) in the client hello message during the initial steps of a TLS handshake or similar connection protocol. A gateway, upon receiving the client hello message, may generate its own OTP for comparison with the OTP in the client hello message. The endpoint and gateway may advantageously generate the OTP based on a secret provided by a threat management facility with a preexisting secure connection to the two entities. If the OTP provided in the client hello message and the OTP generated on the gateway are the same, then the TLS handshake may continue; otherwise, the Transmission Control Protocol (TCP) connection will be terminated by the gateway.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
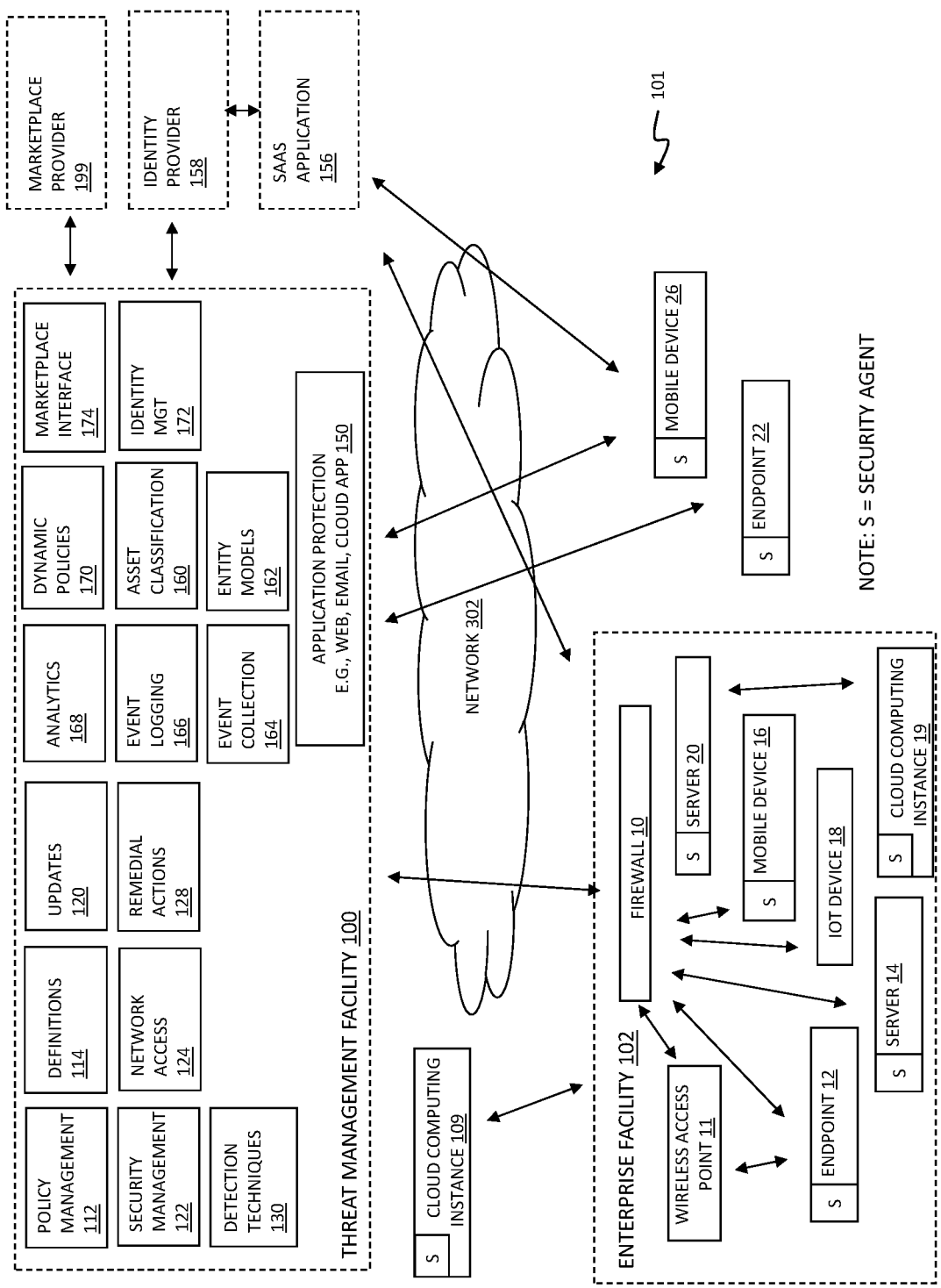
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, the threat management facility 100 may include, or may be connected to a security agent S such as a local security agent deployed on one or more other entities within the threat management system 101. The facilities of the threat management facility 100, and/or a security agent S therefor, may be deployed on the same physical hardware or logical resource as a gateway for an enterprise facility 102, a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a blacklist, an allowed list, a whitelist, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 120, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 128. Aspects of the network access facility 94 may be provided, for example, in the security agent of the endpoint 12, in a wireless access point 11, in a firewall 10, as part of application protection 150 provided by the cloud, and so on.

In an embodiment, the network access facility 94 may have access to policies that include one or more of a block list, an allowed list, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
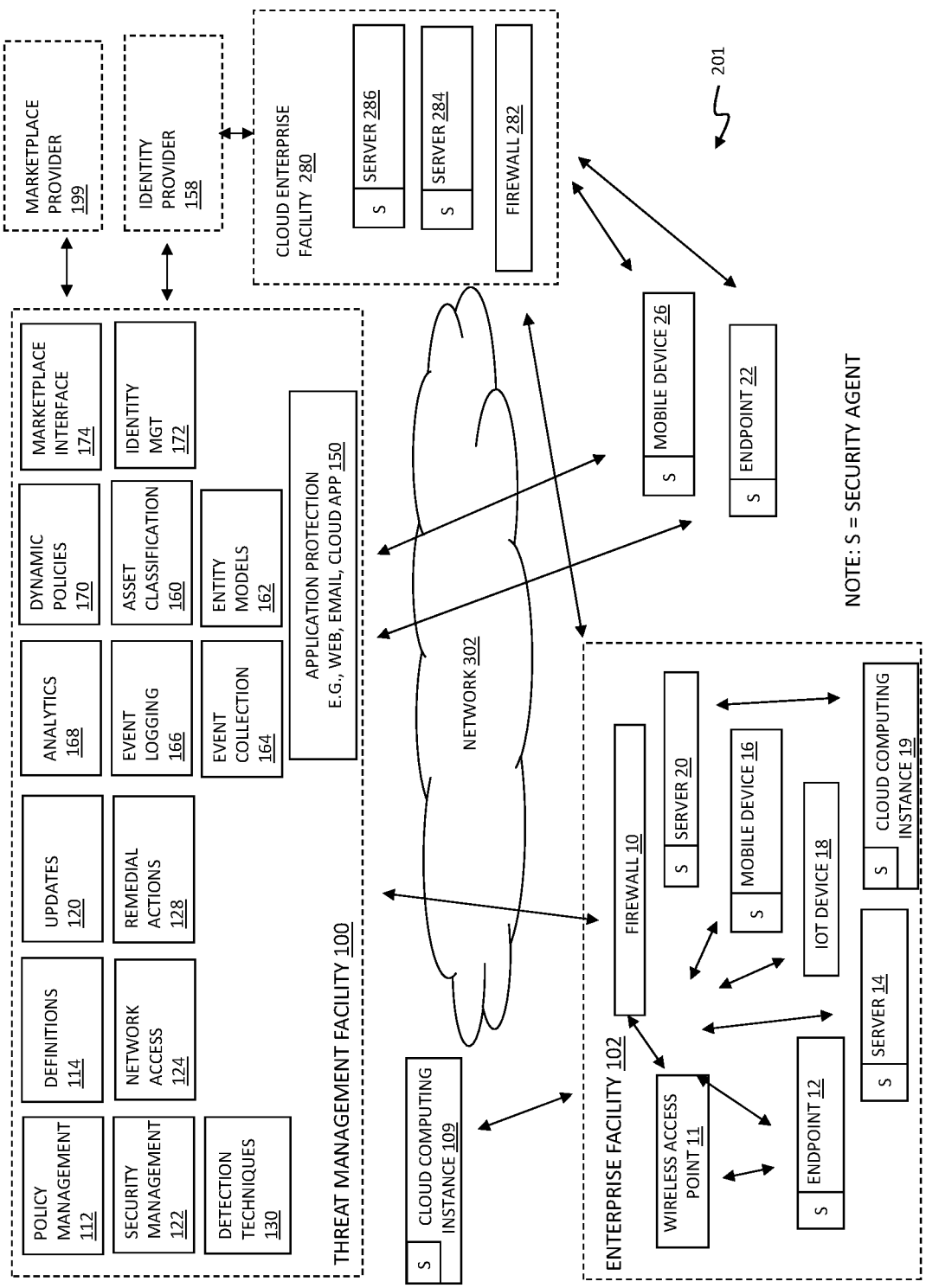
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
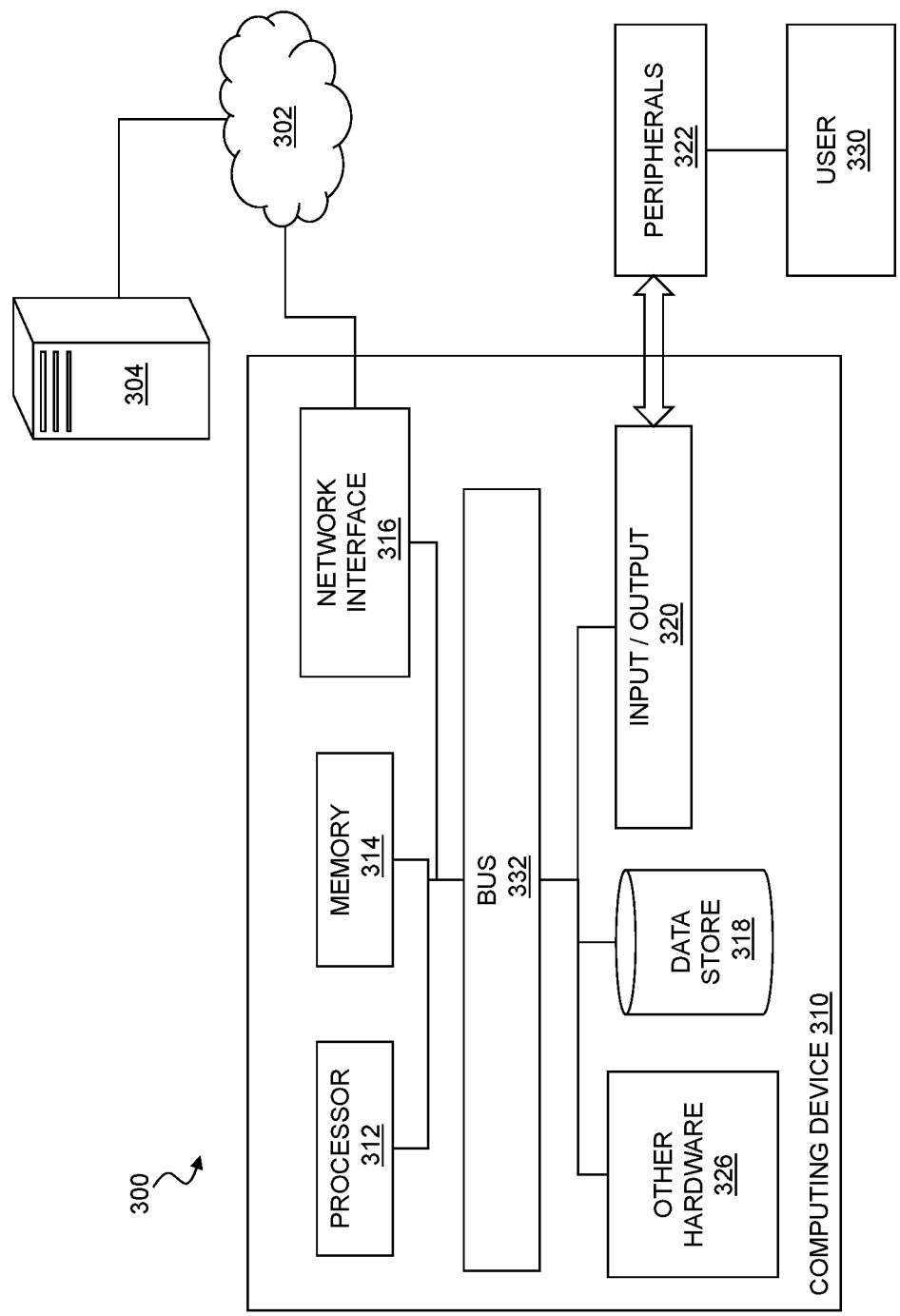
FIG. 3 shows a computer system.

FIG. 3 shows a computer system. In general, the computer system 300 may include a computing device 310 connected to a network 302, e.g., through an external device 304. The computing device 310 may be or include any type of network endpoint or endpoints as described herein, e.g., with reference to FIG. 1 above. For example, the computing device 310 may include a desktop computer workstation. The computing device 310 may also or instead be any suitable device that has processes and communicates over a network 302, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 310 may also or instead include a server, or it may be disposed on a server.

The computing device 310 may be used for any of the entities described in the threat management environment described above with reference to FIG. 1. For example, the computing device 310 may be a server, a client an enterprise facility, a threat management facility, or any of the other facilities or computing devices described therein. In certain aspects, the computing device 310 may be implemented using hardware or a combination of software and hardware, and the computing device 310 may be a standalone device, a device integrated into another entity or device, a platform distributed across multiple entities, or a virtualized device executing in a virtualization environment.

The network 302 may include any network described above, e.g., data network(s) or internetwork(s) suitable for communicating data and control information among participants in the computer system 300. This may include public networks such as the Internet, private networks, and telecommunications networks such as the Public Switched Telephone Network or cellular networks using third generation cellular technology (e.g., 3G or IMT-3000), fourth or fifth generation cellular technology (e.g., 4G, LTE. MT-Advanced, E-UTRA, 5G, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 300. The network 302 may also include a combination of data networks, and need not be limited to a strictly public or private network.

The external device 304 may be any computer or other remote resource that connects to the computing device 310 through the network 302. This may include threat management resources such as any of those contemplated above, gateways or other network devices, remote servers or the like containing content requested by the computing device 310, a network storage device or resource, a device hosting malicious content, or any other resource or device that might connect to the computing device 310 through the network 302.

The computing device 310 may include a processor 312, a memory 314, a network interface 316, a data store 318, and one or more input/output devices 320. The computing device 310 may further include or be in communication with peripherals 322 and other external input/output devices 320.

The processor 312 may be any as described herein, and in general be capable of processing instructions for execution within the computing device 310 or computer system 300. The processor 312 may include a single-threaded processor or a multi-threaded processor. The processor 312 may be capable of processing instructions stored in the memory 314 or on the data store 318.

The memory 314 may store information within the computing device 310 or computer system 300. The memory 314 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 314 may store program instructions, program data, executables, and other software and data useful for controlling operation of the computing device 300 and configuring the computing device 300 to perform functions for a user. The memory 314 may include a number of different stages and types for different aspects of operation of the computing device 310. For example, a processor may include on-board memory and/or cache for faster access to certain data or instructions, and a separate, main memory or the like may be included to expand memory capacity as desired.

The memory 314 may, in general, include a non-volatile computer readable medium containing computer code that, when executed by the computing device 300 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 314 is depicted, it will be understood that any number of memories may be usefully incorporated into the computing device 310. For example, a first memory may provide non-volatile storage such as a disk drive for permanent or long-term storage of files and code even when the computing device 310 is powered down. A second memory such as a random-access memory may provide volatile (but higher speed) memory for storing instructions and data for executing processes. A third memory may be used to improve performance by providing even higher speed memory physically adjacent to the processor 312 for registers, caching, and so forth.

The network interface 316 may include any hardware and/or software for connecting the computing device 310 in a communicating relationship with other resources through the network 302. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 310 and other devices. The network interface 316 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 316 may include any combination of hardware and software suitable for coupling the components of the computing device 310 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 302 such as the Internet. This may also or instead include hardware/software for a WiMax connection or a cellular network connection (using, e.g., CDMA, GSM, LTE, or any other suitable protocol or combination of protocols). The network interface 316 may be included as part of the input/output devices 320 or vice-versa.

The data store 318 may be any internal memory store providing a computer-readable medium such as a disk drive, an optical drive, a magnetic drive, a flash drive, or other device capable of providing mass storage for the computing device 310. The data store 318 may store computer readable instructions, data structures, program modules, and other data for the computing device 310 or computer system 300 in a non-volatile form for subsequent retrieval and use. For example, the data store 318 may store without limitation one or more of the operating system, application programs, program data, databases, files, and other program modules or other software objects and the like.

The input/output interface 320 may support input from and output to other devices that might couple to the computing device 310. This may, for example, include serial ports (e.g., RS-332 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 316 for network communications is described separately from the input/output interface 320 for local device communications, these two interfaces may be the same, or may share functionality, such as where a USB port is used to attach to a WiFi accessory, or where an Ethernet connection is used to couple to a local network attached storage.

A peripheral 322 may include any device used to provide information to or receive information from the computing device 300. This may include human input/output (I/O)

devices such as a keyboard, a mouse, a mouse pad, a track ball, a joystick, a microphone, a foot pedal, a camera, a touch screen, a scanner, or other device that might be employed by the user 330 to provide input to the computing device 310. This may also or instead include a display, a speaker, a printer, a projector, a headset, or any other audiovisual device for presenting information to a user. The peripheral 322 may also or instead include a digital signal processing device, an actuator, or other device to support control or communication to other devices or components. Other I/O devices suitable for use as a peripheral 322 include haptic devices, three-dimensional rendering systems, augmented-reality displays, and so forth. In one aspect, the peripheral 322 may serve as the network interface 316, such as with a USB device configured to provide communications via short range (e.g., Bluetooth, WiFi, Infrared, RF, or the like) or long range (e.g., cellular data or WiMax) communications protocols. In another aspect, the peripheral 322 may provide a device to augment operation of the computing device 310, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 300 may be used as a peripheral 322 as contemplated herein.

Other hardware 326 may be incorporated into the computing device 300 such as a co-processor, a digital signal processing system, a math co-processor, a graphics engine, a video driver, and so forth. The other hardware 326 may also or instead include expanded input/output ports, extra memory, additional drives (e.g., a DVD drive or other accessory), and so forth.

A bus 332 or combination of busses may serve as an electromechanical platform for interconnecting components of the computing device 300 such as the processor 312, memory 314, network interface 316, other hardware 326, data store 318, and input/output interface. As shown in the figure, each of the components of the computing device 310 may be interconnected using a system bus 332 or other communication mechanism for communicating information.

Methods and systems described herein can be realized using the processor 312 of the computer system 300 to execute one or more sequences of instructions contained in the memory 314 to perform predetermined tasks. In embodiments, the computing device 300 may be deployed as a number of parallel processors synchronized to execute code together for improved performance, or the computing device 300 may be realized in a virtualized environment where software on a hypervisor or other virtualization management facility emulates components of the computing device 300 as appropriate to reproduce some or all of the functions of a hardware instantiation of the computing device 300.

In general, the systems and methods disclosed herein provide improvements to a cryptographically secured handshake by permitting early discovery of unauthorized devices, especially when connecting to a secure resource such as a zero trust network access (ZTNA) gateway. In general, devices may connect on a network using a Transport Layer Security (TLS) handshake. It will be understood that a secure handshake is sometimes referred to as a Secure Socket Layer (SSL) handshake because, even though SSL is an outdated and less secure version of secure communication, SSL certificates are still widely used when establishing TLS connections. Both of these techniques, and any other cryptographically-based techniques for establishing secure two-way communications, are referred to herein more generally as cryptographic handshakes, and result in secure or cryptographically secure communication channels. These secure connections may be used, e.g., for general web traffic (where it is readily recognizable by the HTTPS indicator in URLs and a corresponding lock icon or the like in a web browser bar), application programming interface calls, Domain Name System (DNS) queries over HTTPS, zero trust network access connections, within a Transmission Control Protocol (TCP) connection, and so forth.

During the course of a TLS handshake, two entities—typically referred to as a client and server—will specify which version of TLS they will use (e.g., one-way or two-way authentication); determine which cipher suites they will use; authenticate the identity of the server via the server's public key and the SSL certificate authority's digital signature; and generate session keys in order to use symmetric encryption after the handshake is complete.

The TLS handshake begins (after the preliminary synchronization-acknowledge exchange) with a client hello message, in which the client identifies a supported version of TLS and cipher suites supported by the client, and provides a string of random bytes known as the client random. The server responds with a server hello message in which the server provides an SSL certificate (signed by the server's private key), the server's chosen cipher suite, and the server random, which is generally another random string of bytes generated by the server. The client may authenticate the server's certificate using a corresponding public key, and then respond with a premaster secret including another string of random bytes encrypted with a public key for the server. The server can then decrypt the premaster secret using its private key, at which point, both entities have the premaster secret, which can be used to create a shared key for symmetric encryption between them.

While secure, this process uses multiple asymmetric cryptographic steps that are relatively computationally expensive. The present disclosure facilitates termination of the cryptographic handshake, when appropriate, after the first hello message. More specifically, implementations may include the termination of the TLS handshake with rogue devices trying to establish a Web Socket tunnel to a zero trust network access gateway or other secure resource. To accomplish this end, the client may create a one-time password (OTP) using a secret known to the client and the server, along with a variable that is publicly accessible to both. The client may generate the OTP, include the OTP in the hello message (e.g., as a part of the client random), and transmit the OTP to the server. The server may, in turn, independently generate the OTP using the same information and the same algorithm, and compare this result to the OTP provided by the client. If the two OTPs match, then the server can assume that the client is securely managed by a threat management facility or similar resource (because the client has the secret securely received from the threat management facility and that is required to generate the OTP) and proceeds to complete the cryptographic handshake between the two devices.

Figure 4:
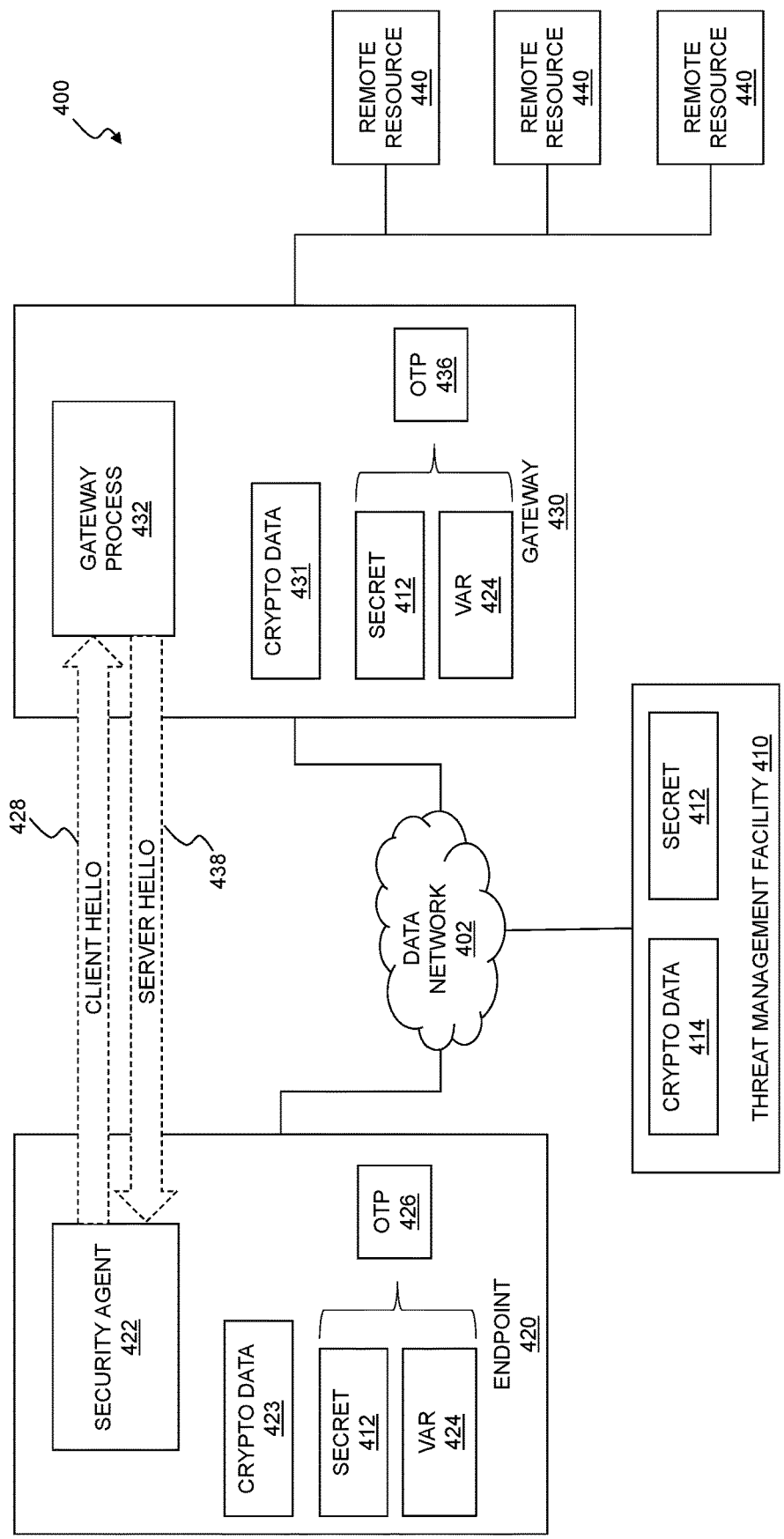
FIG. 4 shows a system for secure communications over a data network.

FIG. 4 shows a system for secure communications over a data network. The system 400 may include a plurality of participants interconnected (e.g., directly or through one or more intermediaries) over a data network 402, where it will be understood that the system 400 and data network 402 may be the same or similar to others as described herein, e.g., with reference to FIGS. 1 and 2. The system 400 may generally include a threat management facility 410, an endpoint 420, a gateway 430, and one or more remote resources 440. The system 400 may, for example, provide a zero trust network access gateway for remote, secure access to one or more zero trust network access applications by an endpoint 420 associated with an enterprise. As further described herein, the gateway 430 and endpoint 420 may be configured to use an improved handshake that supports early identification and termination of sessions with rogue devices, e.g., devices that are not associated with the enterprise.

The threat management facility 410 may be any as described herein. In general, the threat management facility 410 may communicate with, coordinate, and control operation of security functionality for one or more participants in the system 400, such as the endpoint 420 and the gateway 430, by managing and distributing security policies and supporting threat detection and remediation functions. In this capacity, the threat management facility 410 may provide protection from a variety of threats to a variety of compute instances (e.g., a plurality of endpoints 420) associated with an enterprise network, which may be distributed across a variety of locations and use a variety of network configurations.

The threat management facility 410 may be in secure communication with one or more of the endpoint(s) 420, the gateway 430, and one or more remote resources 440 through preexisting secure connections—that is, secure connections that have been created before a gateway-endpoint handshake as described herein.

The threat management facility 410 may store a secret such as a secret key 412 or other non-public information that can be securely shared through the preexisting secure connections with the endpoint 420 and the gateway 430. The threat management facility 410 may be configured by computer executable code to securely communicate the secret key 412 to an endpoint 420 and a gateway 430. For example, the secret key 412 may be distributed when an entity registers with the threat management facility 410, e.g., when joining the enterprise network, and the secret key 412 may be locally stored in a secure manner by each such entity that receives the secret key 412. The threat management facility 410 may also store cryptographic data 414 such as a public key for use in authenticating digital certificates or other cryptographically signed objects from other entities (such as the gateway 430), as well as any other cryptographic material useful for securing communications, validating signed communications, authenticating other entities, and so forth.

The endpoint 420 may be any of the endpoints, compute instances, or computing devices described herein. The endpoint 420 may be a computing device associated with an enterprise network, in which capacity the endpoint 420 may register with the threat management facility 410 for the enterprise network in order to receive security policies, threat management services, and so forth. The endpoint 420 may include a local security agent 422, which may be any as described herein, that provides local security services to the endpoint 420 and supports secure interactions with other entities in the enterprise network. The endpoint 420 may also store cryptographic data 423 used for various cryptographic operations on the endpoint 420. For example, the endpoint cryptographic data 423 may include a certificate chain provided by a certificate authority, and including at least an SSL certificate for the endpoint 420. The cryptographic data 423 may also or instead include a private key used by the endpoint 420 to decrypt incoming data that has been encrypted with an endpoint public key. The endpoint public key may, for example, be included in the SSL certificate for the endpoint 420 so that it can be shared with other entities from the endpoint 420, or the public key may be otherwise stored at the endpoint 420 or in a publicly available location accessible to other entities for use in encrypting data for communication to the endpoint 420.

The gateway 430 may include a gateway for managing network traffic for the enterprise network. The gateway 430 may also or instead include a zero trust network access (ZTNA) gateway providing secure, authenticated access to various remote resource 440 for the enterprise. Thus, in general, the gateway 430 may manage access to protected resources such as applications, electronic mail and messaging services, cloud data and computing services, software-as-a-service applications, data storage, zero trust network access applications, and so forth, by one or more endpoints 420 coupled to the gateway 430 through the data network 402. In this capacity, the gateway 430 may provide secure connectivity using a Web Socket service and a client access port, such as a reverse proxy, or any similarly secure connection technique. In general, a ZTNA environment relies on authentication of endpoints 420 on a resource-by-resource basis. To this end, the system 400 may also include an identity provider that supports, e.g., secure, credential-based authentication of entities within a zero trust network environment. While depicted as a gateway 430, the endpoint 420 may also or instead establish a secure connection to a firewall, a network application, a network device, or the like, any of which may be deployed as a cluster of nodes to support redundancy, error tolerance, high availability, scalability, and so forth. For example, this may include a cluster of gateways coupled to a network through a load balancing device or the like for scalable management of access to resources such as ZTNA applications for the enterprise network. In general, the network appliances may be hardware appliances, virtual appliances, or some combination of these.

The gateway 430 may store cryptographic data 431 used for various cryptographic operations on the gateway 430. For example, the gateway cryptographic data 431 may include a certificate chain including, e.g., an SSL certificate provided for the gateway 430 by a certificate authority. The cryptographic data 431 may also or instead include a private key used by the gateway 430 to decrypt incoming data that has been encrypted with a gateway public key. The gateway public key may, for example, be included in the SSL certificate for the gateway 430 so that it can be shared with other entities from the gateway 430, or the gateway public key may be otherwise stored at the gateway 430 or in a publicly available location accessible to other entities for use in encrypting data for communication to the gateway 430.

In operation, a user of the endpoint 420 may request access to an application or other resource, such as any of the remote resources 440 managed by the gateway 430. This access may be initiated, e.g., by the user selecting an icon for an application in a user interface of the endpoint 420, selecting a hyperlink in a web browser, selecting an application in a menu or other list, or otherwise initiating access to the remote resource 440 with a user action on the endpoint 420. When the resource is one of the remote resources 440 securely managed by the gateway 430, the endpoint 420 will, through the local security agent 422, initiate a secure handshake, such as a TLS handshake, with a gateway process 432 executing on the gateway 430 by sending a client hello message 428 to the gateway 430. The endpoint may include a one-time password (OTP) 426, e.g., in the client random of a TLS client hello message.

The endpoint 420 may create the OTP 426 by applying an algorithm to the secret key 412 and a variable 424 that is derived from data available to both the remote resource 440 and the endpoint 420. The secret key 412 is securely received from the threat management facility 410, and as such, should only be available to registered entities in the enterprise network. The variable 424 may be any piece of information that is mutually available to the endpoint 420 and the gateway 430. For example, the variable 424 may be a time or a time interval based on a mutually available clock. The variable 424 may also or instead be based on a synchronized counter maintained between the endpoint 420 and the gateway 430.

The gateway process 432 on the gateway 430 may respond to the client hello message 428 by generating a second one-time password (OTP) 436 by applying the same algorithm to the secret key 412 and the variable 424. If the second one-time password 436 generated by the gateway 430 matches the one-time password 426 contained in the client hello message 428, the gateway 430 may infer that the endpoint 420 is authenticated to the threat management facility 410, and may proceed to initiate a secure connection with the endpoint 420 by transmitting a server hello message 438 to the endpoint 420 including a signed SSL certificate provided by a certificate authority, along with a public key for encrypting data for secure communication to the gateway 430. The two entities may then continue with a TLS handshake to create a secure connection using symmetric encryption.

In general, the use of the secret key 412 component of the OTP 426 helps to ensure that the endpoint 420 has already registered with the threat management facility 410 before the gateway 430 undertakes the computationally expensive steps of completing a TLS handshake, while the variable 424 component of the OTP 426 helps to ensure that the OTP 426 is unique to the current connection session, e.g., in order to avoid replay attacks or the like. It will be understood that, while the cryptographic data 414, 423, 431 is depicted as locally stored data, this is not strictly required. Identity management and/or key management techniques are available for managing this key material through remote and/or third party resources.

It will be understood that, in certain aspects, the functionality described above with reference to the gateway 430 may occur on the remote resource 440. For example, the remote resource 440 may itself be a gateway 430 of an enterprise network. The remote resource 440 may also or instead include an enterprise software application, a remote service, a cloud computing resource, a cloud data storage resource, a remote database, and the like. In these cases, as with a gateway 430, an endpoint 420 may initiate a handshake for a cryptographically secured communication channel using the techniques described herein provided the remote resource 440 has access to the secret key 412 that is distributed by the threat management facility 410 to managed devices.

Figure 5:
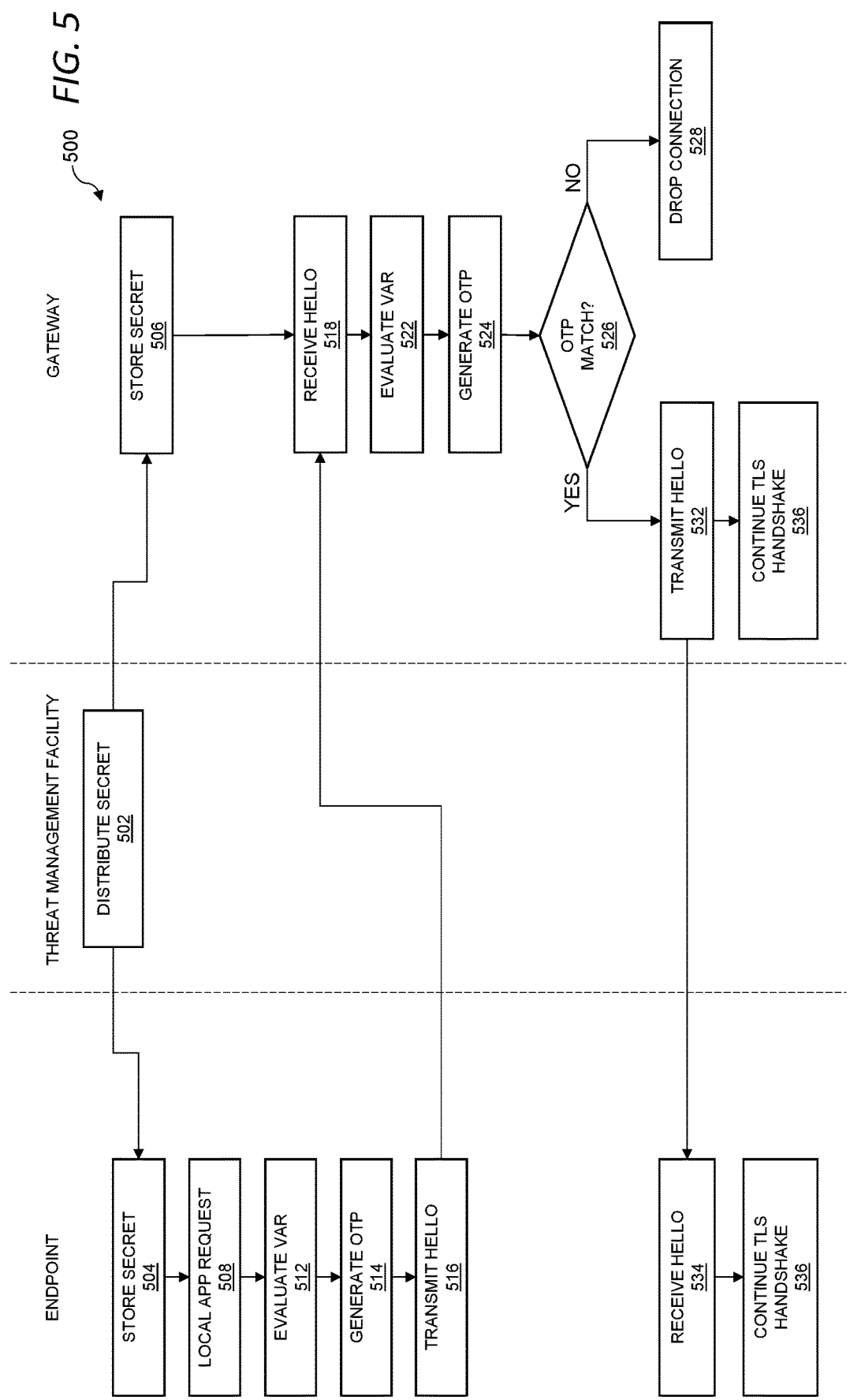
FIG. 5 is a flow chart of a method for providing secure communications over a data network.

FIG. 5 is a flow chart of a method for providing secure communications over a data network. In general, the method 500 may be implemented using any of the systems or computing devices described herein, and may be used to perform a handshake for creating a cryptographically secured communication channel over a public data network. In one aspect, the method 500 may be implemented as a computer program product comprising computer executable code embodied in a non-transitory computer readable medium that, when executing on one or more computing devices (such as one or more of the entities shown in FIG. 5 or any of the systems described herein), performs the steps of the method 500. In general, the improved handshake method 500 disclosed herein provides a technique for terminating a handshake for cryptographically secured communications early in the process, e.g., immediately after the client hello message to a server in a TLS handshake.

As shown in step 502, the method 500 may include distributing a secret key or the like. For example, the method 500 may include providing a secret key to an endpoint from a threat management facility in secure communication with the endpoint, and providing the secret key to a gateway from the threat management facility, which may similarly be in secure communication with the gateway. The secret key may be received, for example, when each entity registers (e.g., for security services) with an enterprise network managed by the threat management facility. As noted above, while a gateway is depicted in FIG. 5, the entity receiving the client hello message for a secure handshake may instead be any secure resource available to the endpoint over a data network and managed by the threat management facility. This may, for example, include a cloud data storage resource, a cloud computing resource, a web server, a remotely hosted application or database, and so forth.

As shown in step 504, the method 500 may include storing the secret key on the endpoint, e.g., during a registration process through which the endpoint joins the enterprise network. The secret key may be securely stored by a local security agent executing on the endpoint, e.g., by encrypting the secret key and/or storing the secret key in a private data location on the endpoint. The secret key may also or instead be stored in a tamper-proof data location in order to prevent third-party tampering with the key data.

As shown in step 506, the method 500 may include storing the secret key on the gateway, e.g., during a registration process through which the gateway joins the enterprise network. The secret key may be securely stored by a gateway process executing on the gateway, e.g., by encrypting the secret key and/or storing the secret key in a private data location on the gateway. The secret key may also or instead be stored in a tamper-proof data location in order to prevent third-party tampering with the key data.

As shown in step 508, the method 500 may include receiving a local request for a remote application or other remote resource from a user of the endpoint. This may, for example, include a user interaction with a user interface for the endpoint such as clicking an icon on a desktop of a user display for the endpoint, selecting an application from a menu, entering an address into a web browser, selecting a hyperlink in another application, and so forth. Where the remote resource requested by the user is a secure resource, the endpoint may respond by initiating a secure handshake with the remote resource, e.g., using the steps below. Although not depicted in FIG. 5, it will be understood that any number of network layer, application layer, or other steps may be performed, such as an initial synchronization message to establish a TCP connection for performing the subsequent TLS handshake.

As shown in step 512, the method 500 may include obtaining and/or deriving a variable from data available to the endpoint. The data used to generate the variable may be similarly available to the gateway, where this data is also used to derive the variable for use by the gateway as discussed below. In one aspect, the variable may be a counter or the like that is synchronously maintained by the endpoint and the gateway. In another aspect, the variable may be based on a time or a time interval for a clock available to the endpoint and the gateway. The time may advantageously employ an interval or epoch of, say thirty seconds, so that precise synchronization between the endpoint and the gateway is not required. While a counter and a time epoch are known techniques for sharing a variable between two devices, the variable may also or instead include any data item that changes over time (so that the one time password can change from handshake to handshake) and is that is available to both the endpoint and the gateway.

As shown in step 514, the method 500 may include generating a password such as a one-time password (OTP) at the endpoint. The password may be generated, for example, by applying an algorithm to the secret key received from the threat management facility and/or the variable independently retrieved by the endpoint and the gateway. For example, the algorithm may hash and truncate a combination of the secret key and the variable to provide the OTP. Creating a password in this manner provides the dual advantage of preventing duplication by using a secret key, while avoiding vulnerability to interception and replay by using a variable data item that changes from handshake to handshake.

In one aspect, the OTP may be a hash-based message authentication code one-time password conforming to the IETF RFC 4226 standard (also referred to as HOTP), which generally supports symmetric generation of one-time passwords based on single-use counter values. To support an HOTP-type one-time password, the variable used by the endpoint and the gateway may be a counter that is synchronized between the endpoint and the gateway, and incremented after each use so that a new OTP is created for a subsequent handshake between the entities. In order to keep the counters for the endpoint and the gateway synchronized, a resynchronization mechanism may be used in which the gateway responds to a failed OTP by attempting a range of possible, adjacent counter values to see if it can find a matching OTP, and then synchronizing the gateway counter accordingly.

In another aspect, the OTP may be a time-based OTP where the variable is a current time or, to provide some flexibility, a current time interval. For example, the OTP may be generated using a time-based one-time password conforming to IETF RFC 6238 (also referred to as TOTP). In one aspect, the current time may be evaluated as a time interval, or epoch, that provides a single identifier for any time falling within a time window with defined starting and end points. For example, the current time may be a thirty second interval so that the variable will be the same for any clock time falling within the thirty second interval. The time interval for TOTP may also or instead be realized as a form of counter based on the integer number of time intervals of duration, Tx, from a known starting time, To. In a manner similar to the HOTP described above, the gateway may respond to a failed password by checking one or more sequentially adjacent intervals of time.

As shown in step 516, the method 500 may include transmitting a message including the password from the endpoint to the gateway to initiate a handshake (e.g., a TLS handshake) for establishing a secure communication channel between the endpoint and the gateway. In one aspect, the message may be a hello message such as a TLS client hello message, and may include handshake information such as a version of TLS supported by the endpoint and one or more cipher suites supported by the client for symmetric encryption. Using, for example, HOTP or TOTP as described above, a one-time password may be expressed, e.g., as a 32-byte token where 8 bytes provide an endpoint ID and 24 bytes provide the standardized one time password. This 32-byte token may be encoded for transmission to the gateway in the client hello message as an SSL or TLS client random.

As shown in step 518, the method 500 may include receiving the message (e.g., the client hello message) from the endpoint at the gateway to initiate a handshake for a secure connection between the endpoint and the gateway. The message may include a password such as any of the one-time passwords described above, which may be encoded in a client random of the client hello message.

As shown in step 522, the method 500 may include obtaining and/or deriving a variable from data available to the gateway. The data used to generate the variable may be a single-use counter value, a time interval, or any other variable data item that is similarly available to the endpoint and the gateway, or derivable from data available to the endpoint and the gateway, and more specifically that is used by the endpoint in step 512 above.

As shown in step 524, the method 500 may include generating, by the gateway, a password for the endpoint. In general, this will be performed by symmetrically generating the password using the same algorithm (or an algorithm with equivalent output) applied by the endpoint, along with the secret key and variable available to the gateway. By way of non-limiting example, this algorithm may use the HOTP standard, the TOTP standard, or any other algorithm suitable for secure, symmetric password generation by two entities connected to a data network.

As shown in step 526, the method 500 may include determining whether the password generated by the gateway matches the password contained in the message received from the endpoint. If the passwords match, the method 500 may proceed to step 532 where the gateway can continue the secure handshake. If the passwords do not match, then the connection may be dropped as shown in step 528. That is, in some aspects, when the passwords do not match, the Transmission Control Protocol (TCP) connection will be terminated by the gateway thus ending the handshake process. This provides significant advantages to a conventional TLS handshake, where the connection is typically not terminated until later, after the resource-intensive validation of a certificate using an asymmetric public key for the gateway.

As shown in step 532, when there is a match between the password generated by the gateway and the password contained in the message received from the endpoint, the method 500 may include transmitting a reply from the gateway to the endpoint. The reply may, for example, be a server hello message containing a certificate for the gateway, such as an SSL certificate signed by a private key of the gateway. Also or instead, the reply may include a cipher suite selected by the gateway (from among available ciphers sent from the endpoint in the client hello message) for use in symmetric encryption of communications between the gateway and the endpoint.

As shown in step 534, the method 500 may include receiving the reply from the gateway (e.g., the server hello message) at the endpoint.

As shown in step 536, in response to the server hello message, the endpoint may continue with the TLS handshake process, beginning with an authentication of the server certificate, e.g., using a public key for the gateway. As the handshake proceeds, the endpoint and the gateway may exchange information for creating a session key (separately at the endpoint and the gateway) for symmetric encryption of a secure communication channel between the endpoint and the gateway. Thus, the handshake of method 500 may result in a secure, symmetrically encrypted communication channel between the gateway and the endpoint based at least in part on information exchanged in the message and the reply, as well as additional information exchanged in subsequent messages of the TLS handshake. For additional security, the TLS handshake may optionally use two-way authentication in which the gateway authenticates to the endpoint and then the endpoint authenticates to the gateway. Once the endpoint and the gateway (or other remote resource) have created the session key, the endpoint and the gateway may securely communicate with one another through the secure communication channel by encrypting data with the session key.

According to the foregoing, an endpoint as described herein may establish a secure communication channel with a remote resource (e.g., a gateway for an enterprise network) by performing the steps of: generating a password with a local security agent executing on the endpoint; transmitting a message including the password from the endpoint to a remote resource to initiate a handshake for a secure communication channel between the endpoint and the remote resource; if a reply is received from the remote resource including a certificate for the remote resource, authenticating the certificate; and, in response to authenticating the certificate, creating a session key based on the password for symmetric encryption of the secure communication channel between the endpoint and the remote resource.

Further according to the foregoing, a gateway or other remote resource may establish a secure communication channel with an endpoint by performing the steps of: receiving a message from an endpoint at the remote resource; generating a first password (e.g., first OTP) for the endpoint using a secret key and a variable, the secret key received from a threat management facility in secure communication with the endpoint and the remote resource, and the variable derived from data available to the remote resource and the endpoint; and, in response to determining that the first password generated by the remote resource matches a second password (e.g., a second OTP) contained in the message, transmitting a reply from the remote resource to the endpoint containing a certificate for the remote resource, the certificate signed by a private key of the remote resource.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
receiving a secret from a threat management facility at an endpoint, wherein the secret is further transmitted by the threat management facility to a remote resource coupled in a secure communicating relationship with the threat management facility;
generating a password with a local security agent executing on the endpoint;
transmitting a message including the password from the endpoint to the remote resource to initiate a handshake for a secure communication channel between the endpoint and the remote resource, wherein the password included in the message to the remote resource is based on the secret securely received from the threat management facility;
if a reply is received from the remote resource including a certificate for the remote resource, authenticating the certificate; and
in response to authenticating the certificate, creating a session key based on the password for symmetric encryption of the secure communication channel between the endpoint and the remote resource.

2. The method of claim 1, wherein the password includes a one-time password.

3. The method of claim 1, wherein the password includes an algorithmically generated password valid for a single login transaction from the endpoint.

4. The method of claim 1, wherein the password is generated using a variable accessible to the endpoint and the remote resource.

5. The method of claim 1, wherein the password is generated using a secret key and a variable.

6. The method of claim 5, wherein the variable is based on a time interval.

7. The method of claim 6, wherein the time interval is at least thirty seconds.

8. The method of claim 5, wherein the variable is based on a counter synchronized at the endpoint and the remote resource.

9. The method of claim 5, wherein the password is a hashed and truncated combination of the secret key and the variable.

10. The method of claim 1, wherein the remote resource includes a gateway to an enterprise network.

11. The method of claim 1, wherein the remote resource includes a zero trust network access gateway.

12. The method of claim 1, wherein the password is encoded as a client random of a secure socket layer client hello message.

13. The method of claim 1, wherein the message includes a client hello message.

14. The method of claim 1, wherein the reply includes a server hello message including a secure socket layer certificate signed by the remote resource using a private key.

15. The method of claim 1, wherein the handshake is a transport layer security handshake.

16. The method of claim 1, wherein the remote resource employs two-way authentication for the secure communication channel.

17. A computer program product comprising computer executable code embodied in a non-transitory computer readable medium that, when executing on one or more computing devices, performs the steps of:
receiving a secret from a threat management facility at an endpoint, wherein the secret is further transmitted by the threat management facility to a remote resource coupled in a secure communicating relationship with the threat management facility;
generating a password with a local security agent executing on the endpoint;
transmitting a message including the password from the endpoint to the remote resource to initiate a handshake for a secure communication channel between the endpoint and the remote resource, wherein the password included in the message to the remote resource is based on the secret securely received from the threat management facility,
wherein the remote resource includes a zero trust network access gateway, and
wherein the message includes a secure socket layer client hello message;
receiving a reply from the remote resource, wherein the reply includes a server hello message including a secure socket layer certificate signed by the remote resource using a private key; and
in response to authenticating the secure socket layer certificate, creating a session key based on the password for symmetric encryption of the secure communication channel between the endpoint and the remote resource.

18. The computer program product of claim 17, wherein the password includes a one-time password.

19. The computer program product of claim 17, wherein the password includes an algorithmically generated password valid for a single login transaction from the endpoint.

20. The computer program product of claim 17, wherein the password is generated using a variable accessible to the endpoint and the remote resource.

21. The computer program product of claim 17, wherein the password is generated using a secret key and a variable.

* * * * *